United States Patent Office 3,613,157
Patented Oct. 19, 1971

3,613,157
PRESSURE CHAMBER FOR TREATING MATERIAL WITH HIGH PRESSURE, SUCH AS ISOSTATIC COMPRESSION OF POWDER BODIES
Torstein Landa, Perti Syvakari, and Erik Westman, Vasteras, Sweden, assignors to Allmänna Svenska Elektriska Aktiebolaget, Vasteras, Sweden
Filed Mar. 10, 1969, Ser. No. 805,756
Claims priority, application Sweden, Mar. 11, 1968, 3,163/68
Int. Cl. B30b 5/02
U.S. Cl. 18—5 H 6 Claims

ABSTRACT OF THE DISCLOSURE

A pressure chamber for the isostatic compression of powder bodies includes a high pressure cylinder with end closures projecting into the cylinder. There are two arrangements for supplying pressure media. One of the end closures is a unit surrounded by the pressure medium which operates on the workpiece, this unit projecting into the cylinder and having a displaceable wall which separates the two pressure media.

BACKGROUND OF THE INVENTION

(1) Field of the invention

The present invention relates to a pressure chamber for the treatment of material with high pressure, such as isostatic compression of powder bodies, for example hard metal products, electrical heating elements comprising an electrical conductor surrounded by a body of pressed powder material and possibly a surrounding tubular casing, and welding or furnace electrodes, or the like.

(2) The prior art

It is known to place one or more powder bodies, usually provided with a sealing casing, in a high pressure chamber for gaseous or liquid pressure medium and apply a high pressure in the chamber so that the bodies are subjected to pressure on all sides and obtain a high, even density and are substantially free from porousness, air pockets, and so on.

By means of such isostatic compression, bodies having more complicated shapes could be produced more easily than by other methods, for example curved hard metal pieces, heating elements having a helical shape or some other complicated shape. The shaping can easily be carried out prior to the isostatic compression. This method produces high quality products with excellent accuracy of dimensions even without calibration, and also a high rate of production. The manufacturing costs are therefore low.

However, one disadvantage which sometimes occurs with this isostatic compression is that pressure media having suitable lubricating properties for high pressure pumps may cause drawbacks if they come into contact with the powder bodies. Oil which has stuck to a heating element or possibly penetrated into the pores is difficult to remove and, due to the non-conducting nature of the oil, gives faulty values for the insulating capacity. Furthermore, oil may for a considerable time cause bad odours when the body is used as a heating element. It may, therefore be difficult to find a common pressure medium which is both suitable for high pressure pumps and for the compressed object.

In one instance the problem has been solved by placing the object in a container with an elastomeric wall in the form of a sack, filling the container with a pressure medium suitable for the object and thereafter sealing it and immersing it in a pressure chamber in which a pressure medium suitable for pressure medium pumps is used. With this arrangement it has been found that the pressure medium in the container is contaminated by pressure medium from the pressure chamber, or vice versa. In order to prevent contamination the container has been washed after it is lifted from and before immersion into the pressure chamber, which involves extra work and requires increased space and thus increased costs.

SUMMARY OF THE INVENTION

A pressure chamber according to the invention for isostatic compression of powder bodies and the like, comprising a high pressure cylinder, end closures projecting into this, two pressure media and means for taking up the axial forces exerted by the pressure media on the end closures is characterised in that one of the end closures comprises a unit surrounded by the pressure medium operating on the workpiece and projecting into the cylinder, said unit having at least one elastomeric or displaceable wall which separates the two pressure media used in the pressure chamber. The elastomeric wall may consist of a cylindrical bag or bellows which at its open end is sealingly connected to the end closure. The end closure may comprise a tubular part projecting into the chamber and the bag is attached to the inner end of this part. The tubular part may be provided with a perforated lid, grid, net or the like which prevents parts in the high pressure chamber from falling into the bag. In unloaded state the bag substantially fills the tubular part. Instead of an elastic bag it is also possible to use a piston which is movable.

BRIEF DESCRIPTION OF THE DRAWINGS

The invention is described further with reference to the accompanying drawings.

DESCRIPTION OF THE PREFERRED EMBODIMENTS

Figure 1:
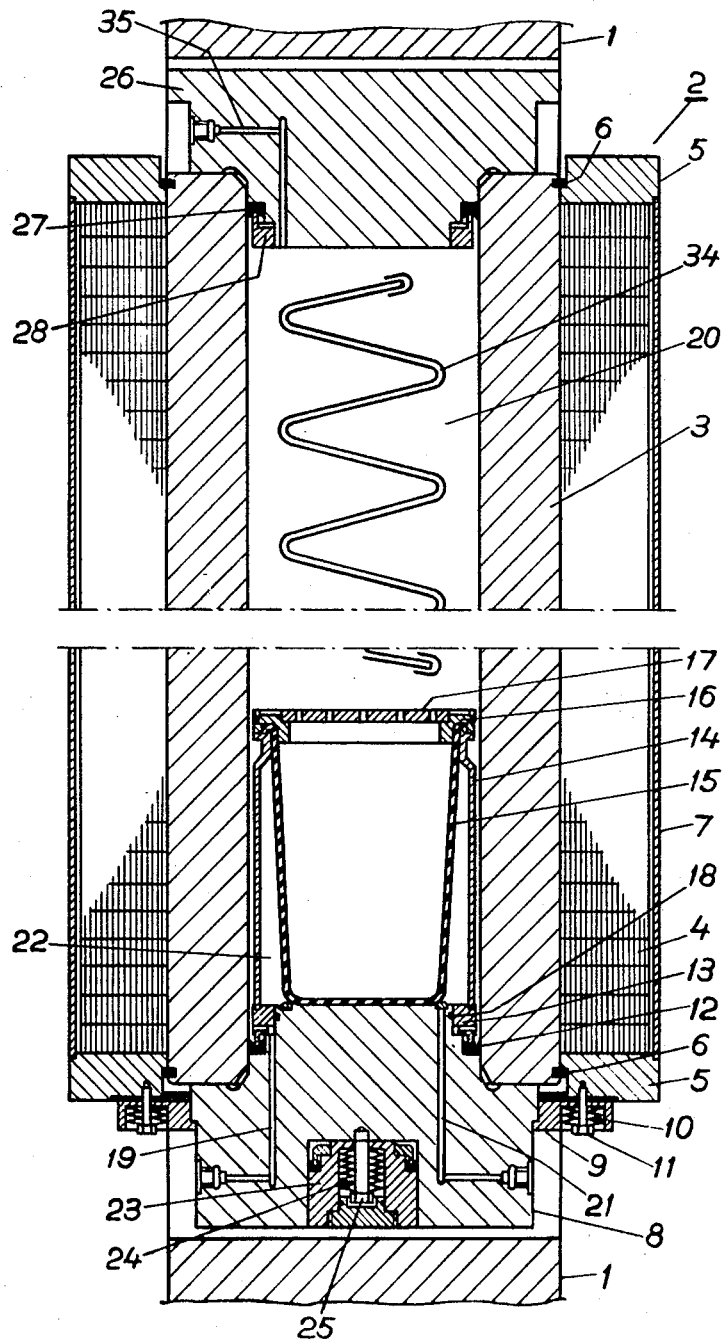
FIG. 1 shows an embodiment with a wall of elastic material and FIG. 2 an embodiment with a displaceable wall in the form of a movable piston. Both embodiments show a pressure chamber of the type where forces operating on the end closures are taken up by a press stand.

In the drawings, 1 designates the yoke in a press stand, not otherwise shown, and 2 a high pressure cylinder consisting of a tube 3 and a prestressed strip sheath 4 surrounding the tube, two support rings 5 which are fixed axially on the tube by locking rings 6, and a protective casing 7. The cylinder is provided with end closures which project a little way into the high pressure cylinder. The lower end closure 8 is suspended in the lower support ring 5 by means of the ring 9, spring 10 and bolts 11. The part projecting into the cylinder has two sections with smaller diameter than the tube 3. In the annular space between the tube 3 and the end closure 8 a sealing ring 12 is applied which is held in position by a holder 13 which is axially fixed to the end closure 8. The holder 13 is rigidly attached to a tubular part 14. A bag 15 is suspended by its upper part between a locking ring 16 and the tubular part 14. A perforated lid 17 is inserted in the locking ring. Between the ring 13 and the end closure 8 is a sealing ring 18. In the end closure are two channels for the supply of pressure medium. Through the channel 19 pressure medium is supplied to the operating space 20 of the pressure chamber and through the channel 21 the space 22 between the tubular part 14 and the bag 15 is supplied with pressure medium. The piston 23 which is suspended in the end closure 8 by means of the bolt 24 and the spring 25 is used to push the end closures into the cylinder after a compression. The part of the upper end closure 26 projecting into the cylinder is also shaped with two parts having smaller diameter than the tube 3. In the annular space between the tube 3 and the end closure 26 is a sealing ring 27 which is held in position by a holder 28 which is axially attached to the end closure. In the end closure is a channel 35 through which the space 20 is emptied while being filled with pressure medium through the channel 19. A powder body to be compressed is designated 29.

Figure 2:
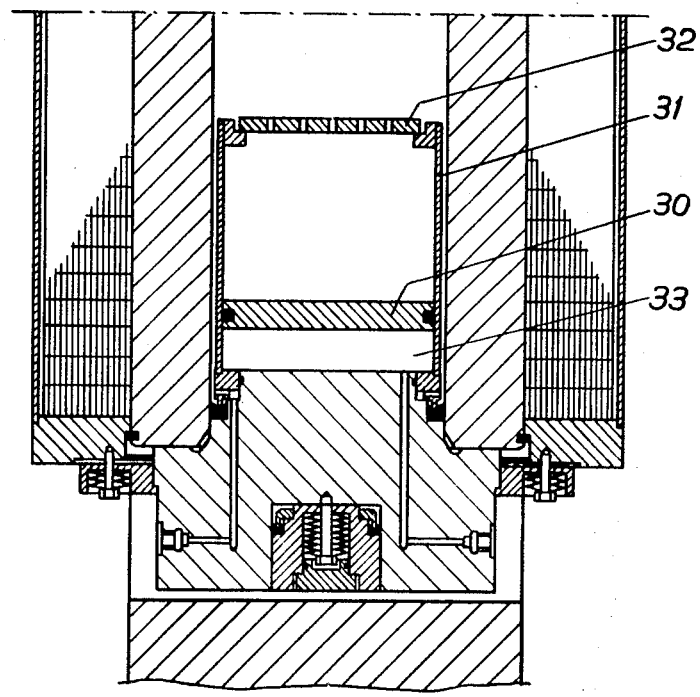

FIG. 2 shows an embodiment of the high pressure chamber in which, instead of an elastomeric bag, a piston 30 is used having a sealing ring 34 to separate the two pressure media. The piston runs in a cylinder 31 which is sealingly connected to the holder 13 for the sealing ring 12. The cylinders are provided with a perforated lid 32. The channel 21 for high pressure medium opens into the space 33 below the piston 30. Otherwise the high pressure chamber is identical to that shown in FIG. 1.

A pressure chamber of the type shown is filled with bodies 34 to be isostatically compressed in a station outside a press stand. The upper end closure 26 is placed in position, the chamber inserted in a press stand and the space 20 of the chamber filled with pressure medium suitable for compression, through the channel 19 in the lower end closure 8. During the filling, air in the space is permitted to flow out through the channel 35 in the upper end closure 26. When the space is filled with liquid, a valve is closed in a conduit, not shown, in connection with the channel and more liquid is added until the end closures have been pushed out of the high pressure cylinder so that they come into contact with the yoke 1 of a press stand, not shown otherwise, after which a valve in a conduit, not shown, in connection with the channel 19 is closed. The chamber is now placed under pressure by conventional pump and/or pressure members supplying the space 22 with a pressure medium. The pressure is between 1,000 and 20,000 bar, usually around 6,000 bar. Upon the increase in pressure the volume of the chamber increases and compresses the pressure medium to some extent. Thus a quantity of pressure medium is required for the pressure increase which corresponds to these alterations in volume. The volumes of the bag 15 and the cylinder 33 must thus be adapted to said volume alteration so that they can be deformed or move, respectively, to the required extent. As an example may be mentioned that at an operating pressure of 6,000 bar the bag 15 or the cylinder 31 must have a useful volume of at least 16% of the total volume of the chamber.

After the compression, the pressure is reduced by tapping off the pressure medium and the end closures are moved to their innermost positions with the help of the operating piston 23, after which the chamber is removed from the press stand, opened and the compressed components taken out. New components can then be inserted.

The invention is not limited to the embodimet shown. Several variations and modifications are feasible within the scope of the following claims. Thus, it is equally suitable for pressure chambers having end closures screwed into the high pressure cylinder.

We claim:

1. Pressure chamber for the treatment of at least one workpiece with high pressure, comprising a high pressure cylinder, fixed end closures projecting into the cylinder, two pressure media and means for taking up the axial forces exerted by the pressure media on the end closures, in which one of the end closures comprises a unit surrounded by the pressure medium operating on the workpiece and projecting into the cylinder, said unit having at least one displaceable wall which separates the two pressure media used in the pressure chamber.

2. Pressure chamber according to claim 1, in which the displaceable wall comprises a cylindrical bag which at its open end is sealingly connected to the end closure.

3. Pressure chamber according to claim 2, in which the end closure comprises a tubular part projecting into the chamber and the bag is attached to the inner end of this tubular part.

4. Pressure chamber according to claim 3, in which the inner end of the tubular part is provided with a perforated cover.

5. Pressure chamber according to claim 3, in which in un-loaded state the bag fills the greater part of the tubular part.

6. Pressure chamber according to claim 1, in which one end closure contains a cylindrical part projecting into the pressure chamber, a piston being axially displaceable in said cylindrical part.

References Cited

UNITED STATES PATENTS

| | | | |
|---|---|---|---|
| 2,648,125 | 8/1953 | McKenna et al. | 18—5 H UX |
| 3,054,147 | 9/1962 | Archibald | 18—5 H UX |
| 3,462,797 | 8/1969 | Asbury | 18—5 H UX |

J. HOWARD FLINT, JR., Primary Examiner

U.S. Cl. X.R.

72—56; 29—421 E; 18—DIG 15